Feb. 24, 1925.  1,527,278
J. B. SLOAN
MEANS FOR MANIPULATING ELECTRIC SWITCHES
Filed Nov. 16, 1923

Witnesses:

Inventor:
Joseph B. Sloan
By Joshua R H Cork
His Attorney.

Patented Feb. 24, 1925.

1,527,278

UNITED STATES PATENT OFFICE.

JOSEPH B. SLOAN, OF EVANSTON, ILLINOIS.

MEANS FOR MANIPULATING ELECTRIC SWITCHES.

Application filed November 16, 1923. Serial No. 675,144.

*To all whom it may concern:*

Be it known that I, JOSEPH B. SLOAN, a citizen of the United States, and a resident of Evanston, county of Cook, and State of Illinois, have invented certain new and useful Improvements in Means for Manipulating Electric Switches, of which the following is a specification.

This invention relates to means for manipulating electric switches, and is designed especially to be used in connection with a vehicle for manipulating the lighting switch of the same and has for its principal object the provision of an improved construction of the character which will be highly efficient in use and economical in manufacture.

Most switches controlling the lights, for instance the head lights of a vehicle are located on what is termed an instrument board carried by the body of the vehicle forwardly of the driver's seat and often this instrument board with its various instruments, for instance the light switch is beyond a convenient reach of the driver and in order that he be able to manipulate the switch, for instance to throw the dim lights into circuit instead of the bright lights, he is required to lean forward and in doing so he is in danger of losing control of the vehicle or in danger of having his mind momentarily diverted from controlling the vehicle. It is, therefore, one of the principal objects of the invention to provide a simple combination and arrangement of parts whereby the driver of the vehicle can manipulate this switch from a convenient point, said point being preferably below the steering wheel of the steering mechanism.

Other objects will appear hereinafter.

The invention consists in the combinations and arrangements of parts hereinafter described and claimed.

The invention will be best understood by reference to the accompanying drawing, showing the preferred form of construction, and forming a part of this specification, and in which—

Figure 1:
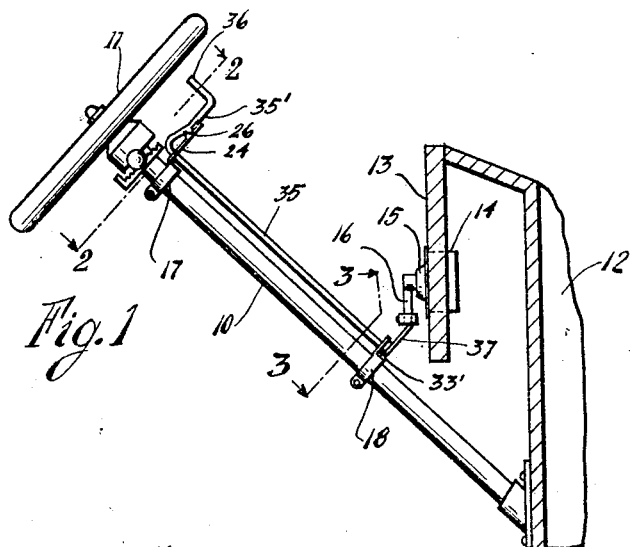
Fig. 1 is a side elvational view of a steering column and wheel and a fragmentary sectional view of the instrument board showing the invention associated with the column and connected to the lighting switch carried by said board.
Figure 2:
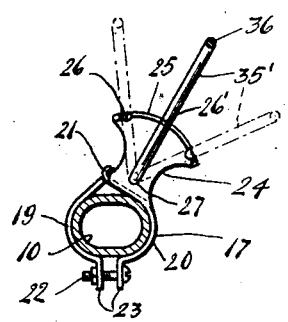
Fig. 2 is a sectional view taken substantially on line 2—2 of Fig. 1.
Figure 4:
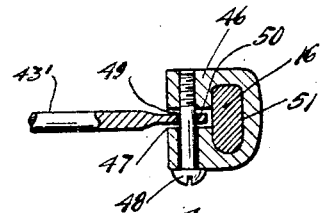
Fig. 4 is a fragmentary sectional view taken substantially on line 4—4 of Fig. 3.

Referring to the drawing showing the preferred form of construction, 10 indicates a steering column of suitable construction and 11 indicates the steering wheel. The body of the vehicle is indicated at 12 and the instrument board carried thereby is indicated at 13. This instrument board carries an electrical distributing block 14 of the usual type having a switch 15 associated therewith which controls the lights of the vehicle and is so constructed that the switch is of the two way type whereby the switch when manipulated in one direction causes the dim lights to burn and when manipulated in the opposite direction causes the bright lights to burn. This switch 15 includes a depending handle 16 substantially oval shape in cross section.

Figure 3:
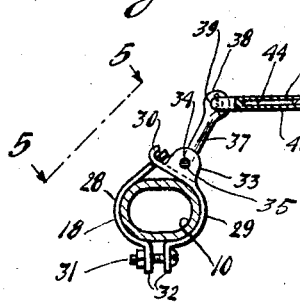
Fig. 3 is a sectional view taken substantially on line 3—3 of Fig. 1.
Figure 5:
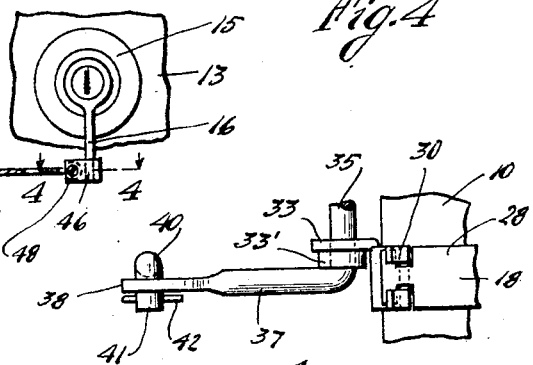
Fig. 5 is a fragmentary view taken substantially on line 5—5 of Fig. 3.

On the steering column in spaced relation with respect to each other I mount a pair of clamps indicated at 17 and 18, the clamp 17 comprises co-operating parts 19 and 20 having end portions 21 interlocked together and clamped to embrace the steering column, below the steering wheel, by a screw member 22 taken through lateral extensions 23 formed as an integral part of the parts. This clamping member also has formed as an integral part thereof a plate indicated at 24 with an upcurved edge 25 with spaced notches 26 formed in said edge and this plate is also provided with an opening 27. The clamp 18 includes co-operating parts 28 and 29 having end portions 30 interlocked together and clamped to embrace the steering column 10 at a point below the clamp 17 by means of a screw member 31 taken through lateral ears 32 and this clamp is provided with an integral extension 33 having an opening 34 formed therein as best shown in Fig. 3.

Extending in parallel and spaced relation with the column 10 is a rocker shaft 35 having a portion taken through the opening 27 and bent at an angle with respect to the body of the rocker shaft and in parallel and spaced relation with the plate at a point above the plate 25 and below the steering wheel 11 and this bent portion, indicated at 35', has its end portion 36 bent substantially at right angles with respect thereto providing an operating handle portion which can be conveniently reached by the driver and manipulated by the fingers. The lower end of the rocker shaft is taken through the opening 34 and has a portion below the extension 33 with a collar 33' loosely mounted thereon and the portion is bent substantially at right angles with respect to the body thereof and this bent portion, indicated at 37, has a flattened extremity as at 38 provided with an opening 39 and it is preferred that this portion extend substantially in parallel relation with respect to the portion 35'. This portion 37 is connected to the handle 16 of the switch by means of a connecting arm 40 which has a bent portion 41 taken through the opening 39 and held from disengagement from the portion 37 by means of a cotter pin 42. The connecting arm includes a part 43 having a socket 44 formed therein adapted to accommodate a part 43' and said part 43' is fixed in the desired position in this socket and the part 43 by means of a small set screw 45; this construction of the arm permits relative longitudinal adjustment of the parts thereof. The outer end of the part 43' of the connecting arm is pivotally connected to a split collar or fastening member 46 by means of a screw member 48 taken through the split portion 47 and through an opening 49 formed in a flattened end portion 50 of said part. This member 46 has an oval shaped opening 51 formed therein adapted to snugly accommodate the handle 16 of the switch and upon a tightening operation of the screw member the member 46 is drawn to clampingly engage the handle 16.

The notches 26 herein mentioned which are formed in the upturned edge 25 of the plate 24 are adapted to receive the angular bent portion 35' of the rocker shaft and when this angular bent portion engages the middle of the notches, such as indicated at 26', the switch 15 is in neutral position. Upon manipulating the rocker shaft 35 through the medium of the operating handle 36 the portion 35' will be moved to engage either the notch to the right or left of the middle of the notches and when in such position either the bright or dim lights will be caused to burn as the case may be by reason of the fact that upon manipulation of the handle portion the switch handle 16 is caused to move due to its connection by means of the connecting arm to the angular extension 37 of the rocker shaft 35.

From the foregoing description it will be seen that the driver can conveniently operate the rocker shaft from a point beneath the steering wheel to cause the bright or dim lights to burn and it is apparent that by reason of the location of the point of operation of the rocker shaft that he, the driver, is not required to bend forward in order to manipulate the switch for the purposes herein mentioned and that at no time will his mind be diverted from the operation of the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In combination with an electrical switch, a steering column and a steering wheel of a vehicle, of clamping members carried by the column and provided with extensions having openings formed therein, the extension adjacent the steering wheel having retaining means therein, a rocker shaft extending through the openings and having an angular bent portion providing an operating handle engageable with said retaining means, and a pivotal connection between the lower end of the rocker shaft and the handle of the switch.

2. In combination with an electrical switch, a steering column and a steering wheel of a vehicle, of spaced clamping members carried by the column, an extension with notches on the clamping members, a member extending through openings formed in the extensions and having an angular bent portion at the upper end thereof providing an operating handle and adapted for engagement with the notches and having an angular bent portion at the lower end thereof with a flattened end portion having an opening formed therein, a split member clampingly engaging the handle of the switch, and means affording a connection between the split member and the flattened end portion of the lower angular bent portion.

3. In combination with an electrical switch, a steering column and a steering wheel of a vehicle, of spaced clamping members carried by the column, an extension on the clamping member nearest the steering wheel having an upturned edge with spaced notches formed therein, an extension formed on the other of said clamping members, a member mounted through openings formed in the extensions and having an angular bent portion at the upper end thereof providing an operating handle and adapted for engagement with the notches and having an angular bent portion at the lower end thereof with a flattened end portion having an opening formed therein, a split member clampingly engaging the handle of the switch, and a connecting arm including parts adjustably connected together with one of the parts taken through the opening of the flattened end portion and the other of the parts pivotally connected to the split member.

In testimony whereof I have signed my name to this specification in the presence of two subscribing witnesses.

JOSEPH B. SLOAN.

Witnesses:
JOSHUA R. H. POTTS,
FREDA C. APPLETON.